(12) United States Patent
Snelling

(10) Patent No.: US 6,568,263 B1
(45) Date of Patent: May 27, 2003

(54) LIQUID LEVEL DETECTOR AND SYSTEM

(76) Inventor: Charles Darwin Snelling, 711 Hamilton Mall, Allentown, PA (US) 18101-2407

( * ) Notice: Subject to any disclaimer, the term of this patent is extended or adjusted under 35 U.S.C. 154(b) by 0 days.

(21) Appl. No.: 09/368,337

(22) Filed: Aug. 3, 1999

(51) Int. Cl.$^7$ ................................................ G07F 23/22
(52) U.S. Cl. ................. 73/295; 73/290 R; 73/204.11; 73/204.17; 340/622; 374/16; 374/45; 374/54
(58) Field of Search ........................... 73/295, 204.11, 73/204.17, 290 R; 340/622; 374/16, 54, 45; 219/438

(56) References Cited

U.S. PATENT DOCUMENTS

| | | | | |
|---|---|---|---|---|
| 3,161,050 A | | 12/1964 | Exner | 73/295 |
| 3,461,446 A | * | 8/1969 | Sergeant | 340/244 |
| 3,465,315 A | | 9/1969 | Alexander et al. | 340/244 |
| 3,485,100 A | * | 12/1969 | Petersen | 338/23 |
| 3,696,675 A | | 10/1972 | Gilmour | 73/295 |
| 4,036,053 A | | 7/1977 | Jenkins | 73/204 |
| 4,065,967 A | | 1/1978 | Beeston | 73/295 |
| 4,089,209 A | | 5/1978 | Grana et al. | 73/61 R |
| 4,135,186 A | * | 1/1979 | Minorikawa et al. | 73/295 |
| 4,248,087 A | * | 2/1981 | Dennis et al. | 73/290 V |
| 4,358,955 A | | 11/1982 | Rait | 73/295 |
| 4,466,282 A | * | 8/1984 | Kuhnel | 73/295 |
| 4,513,616 A | | 4/1985 | Bezard et al. | 73/295 |
| 4,590,797 A | | 5/1986 | Beaubatie et al. | 73/295 |
| 4,609,913 A | * | 9/1986 | Arbogast et al. | 340/622 |
| 4,665,385 A | | 5/1987 | Henderson | 340/539 |
| 4,720,997 A | | 1/1988 | Doak et al. | 23/295 |
| 4,774,838 A | | 10/1988 | Rickson et al. | 73/295 |
| 4,796,471 A | | 1/1989 | Sabin | 73/295 |
| 4,845,486 A | | 7/1989 | Knight et al. | 340/618 |
| 4,912,977 A | * | 4/1990 | Hope | 374/142 |
| 5,023,806 A | | 6/1991 | Patel | 364/509 |
| 5,092,170 A | * | 3/1992 | Honstvet et al. | 73/295 |
| 5,167,154 A | * | 12/1992 | Lee | 73/295 |
| 5,174,153 A | * | 12/1992 | Nakano | 73/295 |
| 5,209,115 A | | 5/1993 | Bond | 73/295 |
| 5,297,393 A | * | 3/1994 | Thompson | 62/129 |
| 5,323,652 A | | 6/1994 | Parker | 73/295 |
| 5,719,332 A | * | 2/1998 | Wallrafen | 340/622 |
| 5,730,026 A | * | 3/1998 | Maatuk | 73/295 |
| 5,908,985 A | * | 6/1999 | Maatuk | 73/295 |

FOREIGN PATENT DOCUMENTS

JP  02161321 A  * 7/1988  ................. 73/295

OTHER PUBLICATIONS

"Accu–Level® Propane Tank Gauge", Hammerhead Tower, Inc., 1988–1996, 1 page.
U.S. patent application Ser. No. 09/080,689 (Attorney Docket No. 1744–001) filed May 18, 1998, abandoned Jul. 7, 1999.

* cited by examiner

Primary Examiner—Daniel S. Larkin
Assistant Examiner—Michael Cygan (57) ABSTRACT

A system for detecting the level of fluid in a fluid containing vessel. The system includes a device for applying energy to a selected location on the vessel. A sensor in proximity to the location detects the energy level at the location during first and second intervals. A memory device stores data representative of the energy detected by the sensor at each interval, and a logic circuit compares the amount of energy of the first interval to that of the second. Data corresponding to the level of fluid in the vessel may be displayed locally or signaled to remote data receiving and display devices, as appropriate.

43 Claims, 2 Drawing Sheets

LIQUID LEVEL DETECTOR AND SYSTEM

BACKGROUND OF THE INVENTION

The present invention relates generally to non-invasive detection systems and, more particularly, to a non-invasive system and method for detecting the level of fluid in a fluid containing storage vessel.

Conventional storage vessels, such as propane tanks, are beneficial both for their mobility and for their suitability to the energy needs of remote locations where access to other forms of energy is often unavailable or costly. As with any storage vessel, however, propane tanks have finite storage capacity and eventually run dry. Few are equipped with precise level detectors nor is it practicable or cost effective in most contexts to remove them individually from service for recharging. When propane tanks run dry, they can also become a safety hazard, particularly when pilot lights go out and during start-up operations.

Typical level detectors such as float-type gauges must be retrofitted to the vessels during assembly. Retrofitting usually requires that the vessel be shut down, depressurized and emptied. In operation, the gauge electronically signals an indicator located externally to the vessel; the signal corresponding to the quantity of product remaining in the vessel. Although generally effective, retrofitting these devices has been found impractical and uneconomical, as well as disruptive of operations.

Another method is level estimation using a computer. In particular, specially designed software is used to monitor usage and predict when refill or recharging is necessary. Previous liquid usage patterns are considered, as well as weather and other data. While useful, computers have been found generally unreliable in predicting runouts.

U.S. Pat. Ser. No. 5,209,115 (Bond) appears to disclose a liquid detector for thin-walled tanks including temperature sensors A, B and a heater 9. Bond appears to disclose further that activation of the heater 9 causes different rates of increase in the temperatures sensed by sensors A, B depending upon the presence of liquid next to the tank wall 3 at the respective locations of the sensors A, B enabling detection of liquid at the respective locations. Bond, however, does not show or suggest the sensors A, B and the heater 9 contained in a modular unit which would facilitate their attachment-to the tank wall 3. In contrast, separate mounting of each of the sensors A, B and the heater 9 on the tank wall 3 appears to be required in Bond. Additionally, Bond appears to provide a pressurant inlet 22 for the supply of pressurizing gas to the tank 1 in addition to the liquid propellant contained in the tank. Adding pressurizing gas to the liquid propellant in the tank 1 obstructs reaching thermodynamic equilibrium thereby inhibiting vaporization of the liquid propellant. This increases the proportion of the heat applied to the tank wall which increases the temperature of the tank wall rather than vaporizes the propellant. As a result, the temperature increase of the tank wall when liquid is present at the sensors A, B is closer to the increase when liquid is not so present thereby impeding indication of such liquid by the temperature difference. Moreover, the liquid detector of Bond appears to be for use in zero gravity which would inhibit convective circulation.

SUMMARY OF THE INVENTION

It is therefore an object of the present invention to provide a non-invasive system and method for detecting the level of fluid in a fluid storage vessel.

Another object of the present invention is to provide a durable, reliable and economical system and method for detecting the level of fluid in a fluid storage vessel.

A further object of the present invention is to provide a non-invasive system and method for detecting the level of fluid in a fluid storage vessel and signaling the same to a user.

Still another object of the present invention is to improve safety of fluid storage vessels, particularly in remote locations.

Yet a further object of the present invention is to provide a non-invasive system and method for detecting the level of fluid in a fluid storage vessel, which may be readily fitted to any vessel without interruption of service or depressurizing and emptying the vessel.

Still a further object of the present invention is a system and method for detecting the rate of heat dissipation at the surface of a fluid storage vessel.

According to one aspect of the present invention there is provided a system for detecting the level of fluid in a fluid containing vessel. A device is provided for applying energy to a selected location on the vessel. A sensor in proximity to the location detects the energy level at the location during first and second time intervals. A memory device is provided for storing data representative of the energy detected by the sensor at each time interval. A logic circuit compares the amount of energy of the first time interval to that of the second time interval, and data corresponding to the level of fluid in the vessel is output to a display device. A power supply is also provided for operating the system.

In accordance with another aspect of the present invention is a system for detecting the level of fluid in a fluid containing vessel. A device is provided for applying energy to a selected location on the vessel. A first sensor in proximity to the energy location detects the energy level at the location at first and second time intervals. A second sensor, positioned at a selected distance from the surface of the fluid, detects the energy level at that position at the same time intervals as the first sensor. A memory device is provided for storing data representative of the energy detected by both sensors at each time interval. A logic circuit compares the amount of energy of the first time interval to that of the second time interval in each respective sensor, and data corresponding to the level of fluid in the vessel is output to a display device. A power supply is also provided for operating the system.

According to a further aspect of the present invention is a method of detecting the level of fluid in a fluid containing vessel, which comprises the steps of:

(a) applying energy to a selected location on the vessel;

(b) detecting the energy level at the location at time intervals using a first sensor in proximity to the energy location;

(c) detecting the energy level at that position at the same time intervals as the first sensor, using a second sensor positioned at a selected distance from the surface of the fluid;

(d) storing data representative of the energy detected by both sensors at each time interval in a memory device;

(e) comparing the amount of energy of the first time interval to that of the second time interval in each respective sensor, using a logic circuit; and (f) outputting data corresponding to the level of fluid in the vessel to a display device.

In accordance with still another aspect of the present invention is a method of detecting the level of fluid in a fluid containing vessel, which comprises the steps of:

(a) applying energy to a selected location on the vessel;
(b) detecting the energy level at the location at a first time interval using a sensor in proximity to the energy location;
(c) storing data representative of the energy detected by the sensor at the first time interval in a memory device;
(d) detecting the energy level at the location during the second time interval;
(e) storing data representative of the energy detected by the sensor at the second time interval in the memory device;
(f) comparing the amount of energy of the first time interval to that of the second time interval using a logic circuit; and
(g) outputting data corresponding to the level of fluid in the vessel to a display device.

BRIEF DESCRIPTION OF THE DRAWINGS

The above and other features and advantages of the present invention are realized in specific, illustrative embodiments thereof, presented hereinbelow in conjunction with the accompanying drawings, in which.

The same numerals are used throughout the various figures of the drawings to designate similar parts. Still other objects and advantages of the present invention will become apparent from the following description of the preferred embodiments.

DETAILED DESCRIPTION

Generally speaking, in a closed pressurized fluid-containing vessel, a liquid and its vapor are at equilibrium. The equilibrium or vapor pressure $P_{vapor}$ of the liquid-vapor system in the vessel is determined by the temperature T of the liquid, rather than that of the vapor. Put another way, a closed system's vapor pressure corresponds to the equilibrium pressure of the liquid contained therein and its vapor at a given temperature, and that temperature, under such circumstances, is the temperature of the warmest liquid.

The boiling or vaporization temperature of a liquid at a given pressure is known as the saturation temperature. This temperature is the boiling point of the liquid, and the condensing point of the vapor. Corresponding to each substance are mathematical relationships between pressure, specific volume or density and temperature known as the equations of state.

Possible equilibrium states of a substance are described on what is known as a p-v-T surface. A p-v-T surface is a three-dimensional contour graph of volume vs. temperature vs. pressure. The relationship between a liquid and its vapor at a given temperature can be determined readily by plotting its location on the p-v-T surface.

The p-v-T surface for propane, for example, indicates the temperature of the warmest liquid in a propane tank or vessel, given pressure measurements from the vessel. This surface will also predict the pressure in the vessel where the temperature of the warmest liquid is known.

In accordance with various aspects of the present invention, when heat is applied to a point or selected volume of liquid in the vessel, the liquid vaporizes, at which time a considerable amount of heat is removed or absorbed from the heat source. As the vapor condenses, the absorbed heat is liberated throughout the system. By this mechanism, large amounts of heat may be removed at a relatively constant rate. It has also been found that the temperature does not rise appreciably as long as the vessel is sufficiently large that the total surface of the vessel can easily dissipate the heat added at the point source. Provided there is liquid adjacent the heat source, the temperature at the source remains relatively constant. Under these conditions, neither the overall temperature of the system nor its pressure rise significantly.

It has now been discovered that the foregoing principles find particular application to non-invasive detection of the fluid level in a fluid storage vessel. More particularly, the present invention relates to a novel system-and method for detecting the rate of heat dissipation at the vessel surface.

In general, upon applying heat to a selected location on the vessel exterior and for a relatively short period of time, there are two responses. First, if there is no liquid present on the side of the vessel wall opposite the hot spot, i.e., if the tank is empty at the thirty percent (30%) line or liquid-vapor interface level, the temperature of the vessel wall comprising, e.g., metal or the like, rises generally greater than about ten (10) degrees, up to about forty (40) degrees or more, depending upon the heat density applied and energy being added in watts. This temperature gradient has been found generally necessary to dissipate or conduct away heat, applied at the heat source through the thin dry metal wall of the vessel.

Second, where there is liquid on the other side of the vessel wall at the same level as the heater, the liquid acts as a refrigerant, lessening the temperature rise to generally within a range of two (2) and five (5) degrees. Since the propane inside is at equilibrium with its vapor, a several degree increase in temperature causes it to boil like a refrigerant, efficiently carrying the heat away. Therefore, the vessel preferably contains only liquid propane and propane vapor because if heat is applied to a location of the vessel wall, where liquid is on the other side, a large proportion of the heat will vaporize the liquid rather than increase the temperature of the vessel wall. Thus, the temperature increase of the vessel wall adjacent to the heater will be limited thereby facilitating indication of the presence of liquid opposite to the location at which heat is applied, i.e., the liquid level being above the location of heat application. Similarly, if the vessel contains substances other than propane, it is preferred that the vessel contain only liquid and vapor having the same chemical composition to facilitate indication of the presence of liquid opposite the heat applied to the vessel since such presence will result in a limited temperature increase of the vessel wall adjacent to the heater.

Referring now to the drawings and more particularly to FIGS. 1 to 5, there is shown generally a specific, illustrative system 10 for detecting the level of a fluid, e.g., 20a, such as propane, in a fluid containing vessel 30 in accordance with various aspects of the present invention, such as a horizontally disposed propane tank having about a 200 to 1000 gallon capacity. According to one aspect of the present invention, the system 10 comprises an energy modulator 11 for applying energy at a selected location 12 on the vessel 30.

Using an energy modulator 11 such as an electric heater, a relatively small amount of energy, e.g., 100 watts or less of heat, is applied at relatively high concentration to a selected location 12 on the vessel exterior, e.g., over an area about the size of a nickel, hereinafter referred to as the "hot spot." Heating is preferably done for a selected period of time, e.g., about 5 minutes. It is also preferred that the location 12 be at a predetermined level line indicative of a minimum desirable fluid level in the vessel 30, e.g., where the vessel is about thirty percent (30%) filled with liquid, as indicated by 20a in FIGS. 2 and 3. The heater 11 is preferably fastened to the vessel 30 using a suitable bonding material 13, such as a conductive epoxy, or other means of connecting the heater to the vessel in a thermo-conductively efficient manner.

Suitable point source heaters 11 include a 5 watt point resistance heater, e.g., a halogen electric light bulb, mounted to the vessel 30 with a conductive epoxy 13 or a heated aluminum wafer conductively bonded to the vessel. Desirably, the heater 11 is energized periodically, for instance, once or twice a day, or continuously, to test the fluid level, e.g., 20a, within the spirit and scope of the present invention. Alternatively, the heater 11 may be energized continuously.

Figure 1:
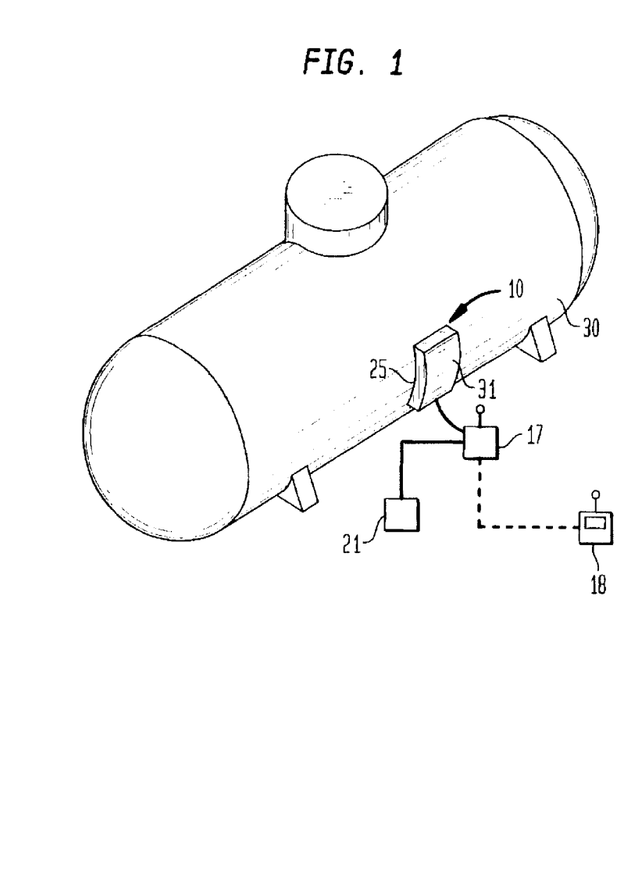
FIG. 1 is a perspective view of a device and system for detecting the level of fluid in a fluid storage vessel, according to one aspect of the present invention.
Figure 2:
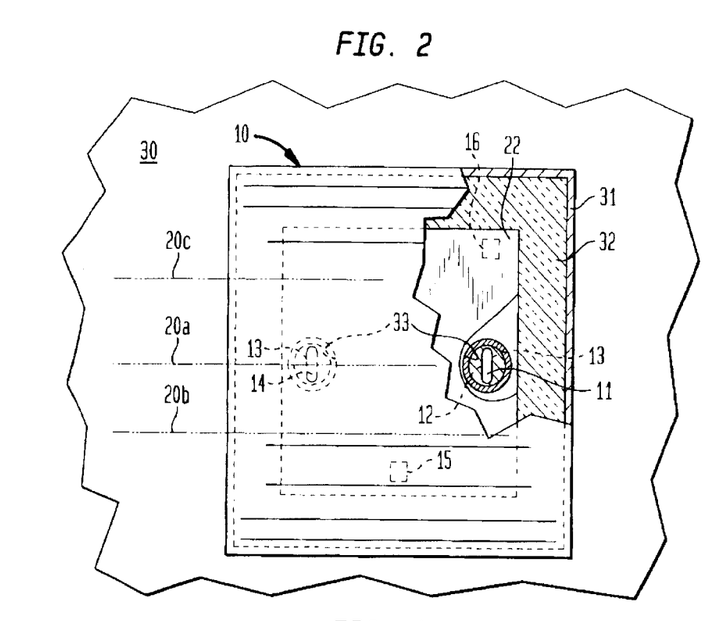
FIG. 2 is a plan view of the device shown in FIG. 1 with portions cut away to show the circuit board and sensor.
Figure 3:
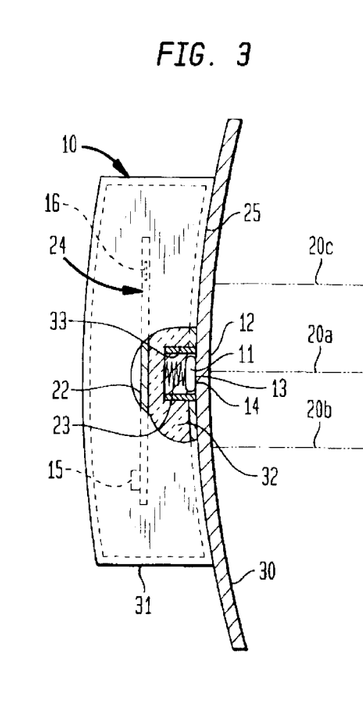
FIG. 3 is a side view of the device shown in FIG. 2 with portions cut away to show the circuit board and sensor.

Next, a temperature sensing device or sensor 14, such as a thermistor or thermocouple, in proximity to the location 12 or hot spot detects the energy level at the location during first and second time intervals. In some configurations, the optimal separation distance between the sensor 14 and heater 11 has been found to be between one (1) and three (3) inches. However, separation distances of other amounts may also prove optimal. Optimal separation distances result in a large temperature change when the portion of the vessel 30 adjacent to the sensor 14 is dry (i.e., the fluid level indicated by 20b in FIGS. 2 and 3 is below the sensor 14) and a small temperature change when the portion of the vessel 30 adjacent to the sensor 14 is wet (i.e., the fluid level 20c is above the sensor 14). A memory device 15 stores data representative of the energy detected by the sensor 14 at each time interval. A logic circuit 16 then compares the amount of energy of the first time interval to that of the second time interval. The logic circuit 16 is mounted on a substrate, such as an electronic circuit board 22.

Alternatively or concurrently therewith, a device 17, e.g., an LED or LCD display, connected to the logic circuit 16 displays selected data indicating the fluid level, e.g., 20a, in the vessel 30. A data transmission device 18, e.g., a data transmitter, may also be provided for selectively signaling the data to a remote data receiving device. The information received may then be shown on a data display such as a computer monitor or the like.

The system 10 is mounted preferably to the outside surface of the vessel 30 at an appropriate location corresponding to a selected liquid level, e.g., 20a, to be signaled as the vessel empties. Desirably, the sensor 14 is located between about two-thirds (⅔) and three-fourths (¾) of the way down from the top to the bottom of the vessel 30, for effective monitoring and warning of impending run-out of the liquid, e.g., 20a. According to one aspect of the present invention, the system 10 is permanently affixed to the vessel 30 using suitable fasteners. Alternatively, the system 10 may be readily detachable for replacement, storage or transfer to another vessel. According to a further embodiment, the system 10 is portable for ready transportation by the user from one vessel 30 to another as part of a regular monitoring program.

Suitably, the system 10 is housed entirely within a case 31, e.g., constructed of a polymeric material, to thermodynamically isolate the same from the environment. Desirably, insulation materials 32 are used between the case 31 and the system 10 for thermal isolation and insulation. The heater 11 and sensor 14 are preferably housed separately in recessed portions 33 for thermal isolation from one another. For added isolation/insulation, materials 32 may also be wrapped about the case 31, as will be understood by those skilled in the art.

Figure 4:
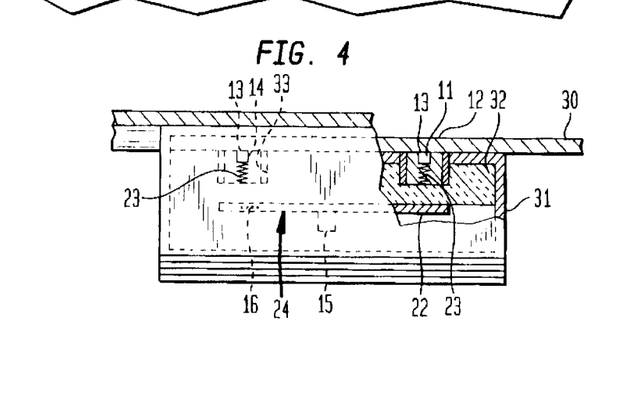
FIG. 4 is an end view of the device shown in FIG. 2 with portions cut away to show the circuit board and sensor.

In one embodiment, the insulation 32 is foam or wool and bonded to the inner surface of the circuit board 22, as shown in FIGS. 3 and 4. The inner surface of the insulation 32 has recessed portions 33 each having a base on which is seated a resilient pad 23, such as a helical spring. The heater 11 is mounted in one of the recessed portions 33 on the associated resilient pad 23. The sensor 14 is mounted in the other of the recessed portions 33 on the corresponding resilient pad 23. Epoxy, polyester, or potting compound is applied to the heater 11 and sensor 14 to solidly encapsulate them in their respective recessed portions 33. The epoxy, polyester, or potting compound, need not necessarily have good insulation properties. During the encapsulation, the respective resilient pads 23 resist insertion of the heater 11 and sensor 14 such that respective, predetermined longitudinal portions of the heater and sensor extend beyond the inner-surface of the insulation 32, as shown in FIGS. 3 and 4.

The memory device 15 is bonded to the outer surface of the circuit board 22. Also mounted on the circuit board 22 is the logic circuit 16. The logic circuit 16, memory device 15, heater 11 and sensor 14 are electrically connected by wires which extend through the insulation 32 and may also extend through the circuit board 22. The circuit-board 22 is thereby a substrate which supports the heater 11, sensor 14, insulation 32, logic circuit 16 and memory device 15. This detector assembly 24 is then mounted in the case 31 such that the exposed inner surfaces of the heater 11 and sensor 14 are flush with the inner edges of the case. The side inner edges 25 of the case 31 are arcuate.

The case 31, with the detector assembly 24 mounted in it, may be attached to the outer surface of the vessel 30 by applying, such as by smearing, a conductive epoxy (such as a paste containing silver available from Metech, Inc. of Elverson, Pa.) to the inner surfaces of the heater 11 and sensor 14. Epoxy, or alternatively self-adhesive release paper, is applied to the inner edges of the case 31, which are subsequently placed against the outer surface of the vessel 30. The arcuate edges 25 of the case 31 facilitate mating of the case to the curved outer surface of the vessel 30, as shown in FIG. 3. The flush relation of the inner surfaces of the heater 11 and sensor 14 relative to the inner edges of the case 31 result in heater and sensor mating with the outer surface of the vessel 30, as shown in FIGS. 3 and 4. The epoxy bonds the heater 11 and sensor 14 to the outer surface of the vessel 30, and the conductivity of the epoxy enables heat transfer between the vessel 30, and heater 11 and sensor 14. The epoxy or release paper bonds the case 31 to the outer surface of the vessel 30 and provides a water-tight connection to obstruct rain of the like from reaching the interior of the case, and the heater 11 and sensor 14 housed in it. The insulation 32 provides thermal isolation of the heater 11 and sensor 14 from the atmosphere surrounding the vessel 30;

A power supply 21, internal or external, such as a battery, electrical outlet, and/or portable generator, may be used to operate the system 10 and its components including the heater 11, sensor(s) 14, memory device 15 and/or logic circuit 16. Preferably, a low voltage heater 11 is used. The power supply 21 may be separated from the vessel 30 by a distance of approximately six (6) feet.

Where a single heater 11 and sensor 14 are used as shown in FIGS. 1 to 4, the system 10 analyzes the rate of temperature change at the surface of the vessel 30 when the heater 11 is activated. When the rate of change is relatively low, the system 10 signals that the liquid level is still above the thirty percent (30%) full mark, indicated by liquid level 20a shown in FIGS. 2 and 3. At a relatively fast rate of change, a different signal is used to indicate that the vessel 30 is becoming empty.

Another aspect of the present invention shown in FIGS. 1 to 4 is a method of detecting the fluid level, e.g., 20a, in a fluid containing vessel 30 using one sensor 14. First, energy, e.g., heat, is applied to a selected location 12 on the vessel 30. The energy level at the location 12 is detected at first and second time intervals using a sensor 14 in proximity to the location. The energy level at the location 12 is detected during the first time interval, then during the second time interval. Data representative of the energy detected by the sensor 14 at each time interval is stored in a memory device 15. The amount of energy of the first time interval is compared to that of the second time interval using the logic circuit 16. The information is then output either locally to a display 17 or the like or to a transmitter. 18 for remote display.

Figure 5:
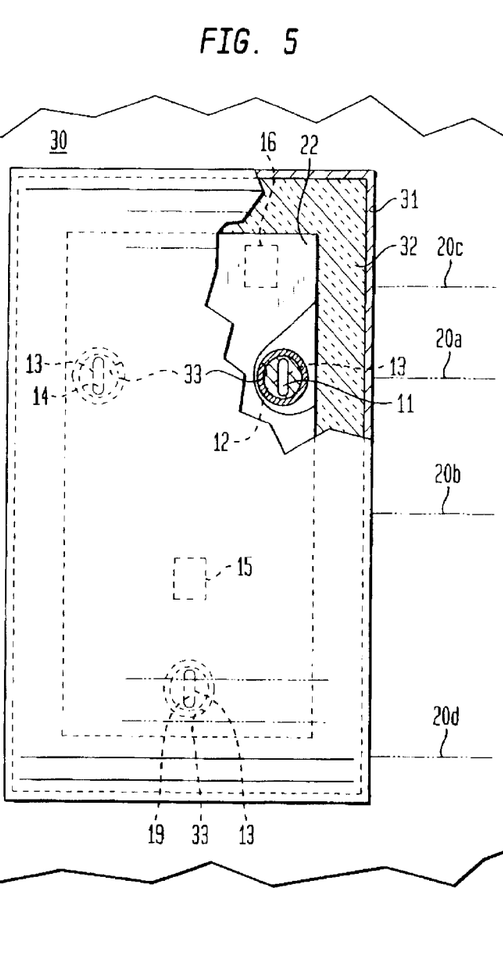
FIG. 5 is a plan view of a device for detecting the level of fluid in a fluid storage vessel, according to another aspect of the present invention with portions cut away to show the circuit board and first sensor.

In accordance with another aspect of the present invention, the system 10 includes a device 11 for applying energy to a selected location 12 on vessel 30, as shown in FIG. 5. Parts in FIG. 5 having counterparts in FIGS. 1 to 4 have the same reference numeral, respectively, as in FIGS. 1 to 4. A first sensor 14 in proximity to the energy location 12 detects the energy level at the location at first and second time intervals. A second sensor 19, e.g., a thermistor, positioned a selected distance from the surface of the liquid 20, e.g., about four (4) inches or more below the first sensor 14, detects the energy level at that position and at the same time intervals as the first sensor. The memory device 15 stores data representative of the energy detected by both of the sensors 14, 19 at each time interval. The logic circuit 16 then compares the amount of energy of the first time interval to that of the second time interval in each of the respective sensors 14, 19.

When the vessel 30 is filled or the liquid level 20c is above the sensor 14, upon activating the heater 11 the temperature at the first sensor 14 is slightly warmer than that of the second sensor 19 below the first sensor. When the liquid level 20b falls to a selected level, e.g., about two (2) to three (3) inches below the heater 11, the second sensor 19 being-:below the liquid level 20b, the temperature differential between the temperature at the first sensor 14 and at the second sensor is relatively high. The first sensor 14 then experiences a rapid rise in temperature until thermal equilibrium is reached in the vessel 30.

A third condition occurs where the liquid level 20d is below both of the sensors 14, 19. Under these circumstances, the first sensor 14 (near the heat source 11) experiences a relatively rapid rise in temperature, whereas the second sensor 19 indicates a temperature increase that is relatively slower and smaller. In other words, there is a large temperature differential between the two sensors 14, 19 under these conditions but not as large as that experienced when the second sensor 19 only is immersed in the liquid resulting, e.g., from the liquid level 20b.

Although the present invention has been described in connection with a computer monitor for data display, other devices for signalling or display may be utilized, giving consideration to the purpose for which the present invention is intended. For example, a light, telephone or buzzer could be utilized within the spirit and scope of the present invention. Alternatively, a memory chip, wheatstone bridge or relay could be utilized. In addition, according to the present invention, a different signal could be-produced for each of the following conditions: (i) where the vessel 30 is full (the first and second sensors 14, 19 being below the liquid level 20c), (ii) the vessel 30 is about thirty percent (30%) full the (first sensor being above the liquid level 20b and the second sensor being below the liquid level 20b), and (iii) where the vessel is effectively "empty" (i.e., the liquid level 20d is below both of the sensors 14, 19).

Another aspect of the present invention is a method of detecting the fluid level, e.g., 20a, in a fluid containing vessel 30 using at least two sensors 14, 19. Initially, energy is applied to the selected location 12 on the vessel 30. Next, the energy level is detected at the location 12 at first and second time intervals using the first sensor 14 in proximity to the energy location. Using the second sensor 19, positioned a selected distance from the first sensor 14, the energy level is then detected at that position at the same time intervals as the first sensor 14. Data representative of the energy detected by both of the sensors 14, 19 at each time interval is stored in the memory device 15. Finally, the amount of energy of the first time interval is compared to that of the second time interval in each of the respective sensors 14, 19, using the logic circuit 16, and the output displayed either locally via the display 17 or to a transmitter 18 for remote display.

Logic circuits can measure a number of different parameters, in accordance with various aspects of the present invention. For example, a logic circuit 16 compares a location thermally remote from the hot spot 12 with a spot closely associated with the hot spot. In this connection, there are two data temperatures to compare. Alternatively or concurrently, the logic circuit 16 compares the starting temperature in proximity to the hot spot 12 of the tank 30 at the beginning of a test cycle with the temperature at the end of the cycle, e.g., about ten (10) minutes later. A large temperature change indicates no liquid, e.g., the fluid level 20b in FIGS. 2 and 3, whereas a small gradient means there is the liquid 20 at or above the hot spot 12, e.g., the fluid level 20c in FIGS. 2 and 3.

Another embodiment of the present invention is that the logic circuit 16 may measure the rate of change or the length of time until the rate of change settles down to a very low value. For instance, where there is no liquid, e.g., the fluid level 20b in FIGS. 2 and 3, the change in temperature of the heated spot 12 over time is incrementally relatively large from about two (2) to about eight (8) minutes. Where there is the liquid at or above the hot spot 12, e.g., the fluid level 20c in FIGS. 2 and 3, the incremental change over time is relatively low, eventually leveling off near zero within about five (5) to about six (6) minutes.

In a further embodiment of the invention, the logic circuit 16 measures the length of time until the $\Delta T$ becomes minimal. In this case, a relatively long time without leveling of the temperature indicates no liquid inside the vessel 30 at the level tested which is the level of the sensor 14, e.g., the fluid surface 20b in FIGS. 2 and 3. A relatively short time indicates the presence of liquid 20, e.g., the fluid surface 20c in FIGS. 2 and 3.

In another embodiment of the invention, the heater 11 may be activated continuously. When the liquid level falls below the level of the heater 11, equivalent to the fluid surface 20a, the temperature of the nearby sensor 14 increases. This method of detection is simpler because timing of the tests (e.g., activation of the heater 11 and measuring temperature changes, via the sensor, over time) is not required. Also, this method provides a more rapid indication as soon as the liquid falls below the limit, equivalent to the fluid surface 20a. Preferably, two sensors 14, 19 are employed, as shown in FIG. 5, one sensor 19 that is remote from the heater 11 and another sensor 14 that is fairly close, e.g., one-half (½) inches to two (2) inches. The remote sensor 19 and the nearby sensor 14 will stay fairly congruent within a few degrees until the liquid level falls below the fluid surface 20a at which point the temperature will rapidly increase on the nearby sensor 14. For this method, the size of the heater 11 may be smaller.

While the present invention has been shown and described for use with propane tanks and materials, its application to other storage vessels and the like is understood, giving consideration to the purpose for which the present invention is intended. For instance, it is understood that explosion-proof materials may be utilized, as required, without departing from the spirit and scope of the present invention.

Cryogenic systems are also considered within the purview of the invention. For example, the system 10 could use an energy modulator comprising a locally applied cryogenic source to operate the system analogously to operation via a locally applied heat source, such as the heater 11, such that the observed temperature change or the rate of temperature change would be in the opposite direction as compared to that resulting from the heater 11.

Still a further aspect of the present invention is a system and method of fluid mass detection, alternatively or concurrently with the foregoing, directed to periodic weighing of the vessel 30. Each of four pipe legs (not shown) of the vessel 30 include an SR4 strain gauge or the like for effecting measurement of stress on the legs. A logic circuit 16 computes the corresponding weight of the vessel 30, including its contents. Corresponding signals are sent to the user when the vessel 30 is almost empty.

Overall, the present invention advantageously provides a system 10 which is safe, reliable, maintenance free, and further provides a method for detection of the liquid level, e.g., 20. The liquid level, e.g., 20a, for a liquid such as propane, or other fluid, especially a thermodynamic fluid at equilibrium with its vapor, may now be readily detected without interference with the service or function of the vessel 30. The system 10 uses relatively little energy but emits a definitive signal detectable using a relatively inexpensive, logic circuit 16 coupled to the sensors 14, 19 each which may comprise a thermistor. Moreover, since operation of the present invention is based upon absolute temperature, it is operational and effective in any weather environment, including extremes of heat, cold, dryness and moisture.

Since from the foregoing the construction and advantages of the invention may be readily understood, further explanation is believed unnecessary. However, since numerous modifications will readily occur to those skilled in the art after consideration of the foregoing specification and accompanying drawings, it is not intended that the invention be limited to the exact construction shown and described, but all suitable modifications and equivalents may be resorted to which fall within the scope of the appended claims.

What is claimed is:

1. A system for detecting the level of fluid in a fluid containing vessel, comprising:
    a substrate;
    a heater for applying energy to a selected location on the vessel, said heater being mounted on said substrate;
    a sensor in proximity to said location for detecting the energy level at said location during a first and second time interval, said sensor being mounted on said substrate;
    a memory device for storing data representative of the energy detected by said sensor at said first and second time intervals, said memory device being mounted on said substrate;
    a logic circuit for comparing the amount of energy of said first time interval to that of said second time interval, said logic circuit making said comparison independently of any other energy amount detected by any other sensor thermally coupled to the vessel, said logic circuit being mounted on said substrate;
    a means for displaying data corresponding to the level of fluid in the vessel; and
    a power supply for operating the system.

2. The system set forth in claim 1 including a case entirely covering said substrate, heater and sensor for thermodynamically isolating said substrate, heater and sensor.

3. The system set forth in claim 1 wherein the power supply is remote from said substrate.

4. The system set forth in claim 1 comprising a means for displaying selected data connected to the logic circuit.

5. The system set forth in claim 2 comprising a data transmission device for selectively signaling data corresponding to the level of fluid in the vessel to a remote data receiving device.

6. The system set forth in claim 5 wherein the data receiving device includes a data display.

7. The system set forth in claim 1 wherein the fluid is in equilibrium with its vapor.

8. A system for detecting the level of fluid in a fluid containing vessel, comprising:
    a substrate;
    a heater for applying energy to a selected location on the vessel, said heater being mounted on said substrate;
    a first sensor in proximity to said location for detecting the energy level at said location during a first and second time interval, said first sensor being mounted on said substrate;
    a second sensor, positioned at a selected distance from the surface of the fluid, for detecting the energy level at that position during said first and second time intervals of said first sensor, said second sensor being mounted on said substrate;
    a memory device for storing data representative of the energy detected by said first and second sensors during said first and second time intervals, said memory device being mounted on said substrate;
    a logic circuit for comparing the amount of energy of said first time interval to that of said second time interval in the respective ones of said first and second sensors, said logic circuit making each of said comparisons independently of any other energy amount detected by any other sensor thermally coupled to the vessel;
    a means for displaying data corresponding to the level of fluid in the vessel; and
    a power supply for operating the system.

9. The system of claim 8 including a case entirely covering said substrate, heater and sensor for thermodynamically isolating said substrate, heater and sensor.

10. The system set forth in claim 8 comprising a means for displaying selected data connected to the logic circuit.

11. The system set forth in claim 8 wherein the power supply is remote from said substrate.

12. The system set forth in claim 8 comprising a data transmission device for selectively signaling data corresponding to the level of fluid in the vessel to a remote data receiving device.

13. The system set forth in claim 12 wherein the data receiving device includes a data display.

14. The system set forth in claim 8 wherein the fluid is in equilibrium with its vapor.

15. A method of detecting the level of fluid in a fluid containing vessel wherein substantially all of any vapor in the vessel is the same substance as the liquid, comprising the steps of:
(a) changing the thermal energy to a selected location on the vessel;
(b) detecting the temperature at the location at first and second time intervals using a first sensor in proximity to the energy location;
(c) detecting the temperature at the position at said first and second time intervals of said first sensor, using a second sensor positioned at a preselected distance from the surface of the fluid;
(d) storing data representative of the temperature detected by said first and second sensors during said first and second time intervals in a memory device;
(e) comparing the temperature of said first time interval to that of said second time interval for each respective one of said first and second sensors, using a logic circuit; and
(f) outputting data corresponding to the level of fluid in the vessel to a display device.

16. The method set forth in claim 15 which further comprises the step of displaying selected data to the user.

17. The method set forth in claim 15 which further comprises the step of signaling data corresponding to the level of fluid in the vessel to a remote data receiving device.

18. The method set forth in claim 17 wherein data received by the remote data receiving device is shown on a data display.

19. A method of detecting the level of fluid in a fluid containing vessel, comprising the steps of:
(a) applying energy to a selected location on the vessel such that said energy is transferred to a localized region within the vessel, said localized region being contiguous with the inner surface of the vessel and having a volume which is substantially less than the total volume of the interior of the vessel, said localized region and said energy application being sufficiently limited such that said energy application causes no more than an insubstantial energy increase outside of said localized region within the vessel;
(b) detecting the energy level at the localized region at a first time interval using a sensor in proximity to the localized region;
(c) storing data representative of the energy detected by the sensor at said first time interval in a memory device;
(d) detecting the energy level at the localized region during a second time interval;
(e) storing data representative of the energy detected by the sensor at a second interval in the memory device;
(f) comparing the amount of energy of the first time interval to that of the second time interval using a logic circuit, said comparison being independent of any other energy amount detected by any other sensor thermally coupled to the vessel; and
(g) outputting data corresponding to the level of the fluid in the vessel to a display device.

20. The method set forth in claim 19 which further comprises the step of displaying selected data to the user.

21. The method set forth in claim 19 which further comprises the step of signaling data corresponding to the level of fluid in the vessel to a remote data receiving device.

22. The method set forth in claim 19 wherein data received by the remote data receiving device is shown on a data display.

23. The method set forth in claim 19 wherein the fluid is in equilibrium with its vapor.

24. A system for detecting the level of fluid in a fluid containing vessel, comprising:
a detector assembly including
a substrate,
an energy modulator conductively connected to a selected location on the vessel for changing the amount of thermal energy at said location, said energy modulator being mounted on said substrate,
a sensor mounted on said substrate in proximity to said location for detecting the amount of thermal energy, said sensor producing an electrical signal indicating the thermal energy amount at said location, and
a logic circuit mounted on said substrate and electrically connected to said sensor for receiving said thermal energy signal, said logic circuit providing for comparison of said thermal energy signal to a reference value, said logic circuit making said comparison independently of any other thermal energy amount detected by any other sensor thermally coupled to the vessel said logic circuit further providing for production of a level signal indicating the level of fluid in the vessel;
a means for displaying data corresponding to the level of fluid in the vessel, said display means being electrically connected to said logic circuit for receiving said level signal; and
a power supply electrically connected to said heater, sensor, logic circuit, and display means.

25. The system set forth in claim 24 wherein said energy modulator comprises a heater.

26. A system for detecting the level of fluid in a fluid containing vessel, comprising:
a detector assembly including
a substrate,
an energy modulator conductively connected to a selected location on the vessel for changing the amount of thermal energy at said location, said energy modulator being mounted on said substrate, said energy modulator comprising a cryogenic source,
a sensor mounted on said substrate in proximity to said location for detecting the amount of thermal energy, said sensor producing an electrical signal indicating the thermal energy amount at said location, and
a logic circuit mounted on said substrate and electrically connected to said sensor for receiving said thermal energy signal, said logic circuit providing for comparison of said thermal energy signal to a reference value, said logic circuit further providing for production of a level signal indicating the level the level of fluid in the vessel;

a means for displaying data corresponding to the level of fluid in the vessel, said display means being electrically connected to said logic circuit for receiving said level signal; and a power supply electrically connected to said heater, sensor, logic circuit, and display means.

27. The system set forth in claim 24 and further comprising a case in which said detector assembly is supported, said case being bondable to the vessel to facilitate conductive contact between said energy modulator and the vessel, and between said sensor and the vessel.

28. The system set forth in claim 27 wherein the vessel has a cylindrical outer surface, said case having side inner edges for said bonding to the vessel, at least a portion of said side inner edges having an arcuate extent to facilitate engagement with the outer surface of the vessel.

29. The system set forth in claim 24 and further comprising a memory device mounted on said substrate, said memory device being electrically connected to said sensor and logic circuit for storing data representative of said thermal energy signal produced by said sensor during at least two discrete times of a predetermined time interval.

30. A system for detecting the level of a liquid in a vessel, comprising:

a heater mounted on the vessel such that said heater is thermally coupled to the interior of the vessel, said heater being able to be actuated to add heat within the vessel;

a first sensor mounted on the vessel in proximity to said heater, said first sensor being thermally coupled to the interior of the vessel to detect the temperature therein, said first sensor being able to be actuated to generate an electrical signal defining a first temperature signal indicative of said detected temperature; and a processor electrically connected to said first sensor for receiving said first temperature signal after actuation of said heater, said processor being programmed to calculate a temperature index selected from the group consisting of (i) said first temperature signal, (ii) the difference between two of said first temperature signals corresponding to different times, and (iii) the rate of change of said first temperature signal relative to a selected time period, said processor being further programmed to compare said temperature index to a reference wherein said comparison is independent of any other temperature signal received by any other sensor thermally coupled to the vessel, said processor being further programmed to generate an electrical signal defining an elevation signal indicative of the elevation of the upper surface of the liquid being either above or below said first sensor.

31. A system as set forth in claim 30 and further comprising a substrate on which said heater and first sensor are mounted.

32. A system as set forth in claim 30 wherein substantially all of any vapor in the vessel is the same substance as the liquid.

33. A system as set forth in claim 30 wherein said heater may be actuated to add heat to a localized region within the vessel, said localized region being contiguous with the inner surface of the vessel and having a volume which is substantially less than the total volume of the interior of the vessel, said localized region and said heat addition being sufficiently limited such that said heat addition causes no more than an insubstantial temperature increase outside of said localized region within the vessel, said first sensor being thermally coupled to said localized region to detect the temperature therein.

34. A system as set forth in claim 30 and further comprising an interface electrically connected to said processor for receiving said elevation signal for use as the basis for communicating to the user the relative elevation of the liquid upper surface as either above or below said first sensor.

35. A system as set forth in claim 30 and further comprising a power supply electrically connected to said heater, first sensor and processor.

36. A system as set forth in claim 30 and further comprising a case in which said heater and sensor are located when said heater and first sensor are connected to the outer surface of the vessel, said case being formed of material for thermodynamically isolating said heater and first sensor from the environment outside of the vessel.

37. A system as set forth in claim 30 and further comprising a case in which said heater and first sensor are supported, said case having surfaces for bonding to the outer surface of the vessel.

38. A system as set forth in claim 30 wherein the vessel has a cylindrical outer surface, said system further comprising a case in which said heater and first sensor are located when said heater and first sensor are connected to the outer surface of the vessel, said case having side inner edges for bonding to the outer surface of the vessel, at least a portion of said side inner edges having an arcuate extent to facilitate engagement with the outer surface of the vessel.

39. A method for detecting the level of a liquid in a vessel, comprising:

actuating a heater which is mounted on the outer surface of the vessel such that the heater is thermally coupled to the interior of the vessel, said actuation of the heater adding heat within the vessel;

actuating a first sensor mounted on the vessel in proximity to the heater, the first sensor being thermally coupled to the interior of the vessel to detect the temperature therein, the first sensor generating an electrical signal defining a temperature signal indicative of the detected temperature; and actuating a processor electrically connected to the first sensor for receiving the temperature signal after actuation of the heater, the processor calculating a temperature index selected from the group consisting of (i) said first temperature signal, (ii) the difference between two of said first temperature signals corresponding to different times, and (iii) the rate of change of said first temperature signal relative to a selected time period, the processor comparing the temperature index to a reference wherein said comparison is independent of any other temperature signal received by any other sensor thermally coupled to the vessel, the processor generating an electrical signal based on said comparison, the electrical signal defining an elevation signal indicative of the elevation of the upper surface of the liquid being either above or below the first sensor.

40. A method as set forth in claim 39 wherein substantially all of any vapor in the vessel is the same substance as the liquid.

41. A method as set forth in claim 39 wherein said actuation of the heater adds heat to a localized region within the vessel, the localized region being contiguous with the inner surface of the vessel and having a volume which is substantially less than the total volume of the interior of the vessel, the localized region and said heat addition being sufficiently limited such that said heat addition causes no more than an insubstantial temperature increase outside of the localized region within the vessel, the first sensor being thermally coupled to the localized region such that said temperature detection by the first sensor is of the temperature in the localized region.

42. A system for detecting the level of a liquid in a vessel, comprising:

a heater mounted on the vessel such that said heater is thermally coupled to the interior of the vessel, said heater being able to be actuated to add heat within the vessel;

a first sensor mounted on the vessel in proximity to said heater, said first sensor being thermally coupled to the interior of the vessel to detect the temperature therein, said first sensor being able to be actuated to generate an electrical signal defining a first temperature signal indicative of said detected temperature; and a processor electrically connected to said first sensor for receiving said first temperature signal after actuation of said heater, said processor being programmed to calculate a temperature index selected from the group consisting of (i) said first temperature signal, (ii) the difference between two of said first temperature signals corresponding to different times, and (iii) the rate of change of said first temperature signal relative to a selected time period, said processor being further programmed to compare said temperature index to a reference wherein said comparison is independent of any other temperature signal received by any other sensor thermally coupled to the vessel, said processor being further programmed to generate an electrical signal defining an elevation signal indicative of the elevation of the upper surface of the liquid being either above or below said sensor, a substrate on which said heater and first sensor are mounted;

and a resilient pad between said heater and substrate, said resilient pad being oriented relative to said heater and substrate to forcibly direct said heater against the vessel.

43. A system for detecting the level of a liquid in a vessel, comprising:

a heater mounted on the vessel such that said heater is thermally coupled to the interior of the vessel, said heater being able to be actuated to add heat within the vessel;

a first sensor mounted on the vessel in proximity to said heater, said first sensor being thermally coupled to the interior of the vessel to detect the temperature therein, said first sensor being able to be actuated to generate an electrical signal defining a first temperature signal indicative of said detected temperature; and a processor electrically connected to said first sensor for.

* * * * *

UNITED STATES PATENT AND TRADEMARK OFFICE
CERTIFICATE OF CORRECTION

PATENT NO.    : 6,568,263 B1
DATED         : May 27, 2003
INVENTOR(S)   : Charles Darwin Snelling It is certified that error appears in the above-identified patent and that said Letters Patent is hereby corrected as shown below:

<u>Column 16,</u>
Line 27, strike "a processor electrically connected to said first sensor for." , and insert the following:
-- a processor electrically connected to said first sensor for receiving said first
   temperature signal after actuation of said heater, said processor being
   programmed to calculate a temperature index selected from the group consisting
   of (i) said first temperature signal, (ii) the difference between two of said first
   temperature signals corresponding to different times, and (iii) the rate of change
   of said first temperature signal relative to a selected time period, said processor
   being further programmed to compare said temperature index to a reference
   wherein said comparison is independent of any other temperature signal
   received by any other sensor thermally coupled to the vessel, said processor
   being further programmed to generate an electrical signal defining an elevation
   signal indicative of the elevation of the upper surface of the liquid being either
   above or below said sensor,
a substrate on which said heater and first sensor are mounted;
and a resilient pad between said sensor and substrate, said resilient pad being oriented
   relative to said heater and substrate to forcibly direct said first sensor against the
   vessel. --

Signed and Sealed this

Second Day of September, 2003

JAMES E. ROGAN
*Director of the United States Patent and Trademark Office*